United States Patent
McLaughlin

(12) 
(10) Patent No.: US 6,210,766 B1
(45) Date of Patent: Apr. 3, 2001

(54) HOLOGRAPHIC DECORATED TUBE PACKAGE

(75) Inventor: Heather Larkin McLaughlin, Lawrenceville, NJ (US)

(73) Assignee: Colgate-Palmolive Company, New York, NY (US)

( * ) Notice: Subject to any disclaimer, the term of this patent is extended or adjusted under 35 U.S.C. 154(b) by 0 days.

(21) Appl. No.: 09/141,174

(22) Filed: Aug. 26, 1998

(51) Int. Cl.$^7$ .............................. B65D 35/10; B29D 22/00
(52) U.S. Cl. ...................... 428/35.7; 428/36.6; 428/36.7; 428/36.91; 428/195; 222/92; 222/107
(58) Field of Search .................... 428/35.7, 36.6, 428/36.7, 36.91, 195, 200; 222/92, 107; 359/1

(56) References Cited

U.S. PATENT DOCUMENTS

| | | | |
|---|---|---|---|
| 4,006,275 | 2/1977 | Monia | 40/299.01 |
| 4,728,377 | 3/1988 | Gallagher | 156/58 |
| 4,767,016 | 8/1988 | Cook, Jr. et al. | 215/230 |
| 4,892,209 | * 1/1990 | Dorfman et al. | 215/277 |
| 4,921,319 | 5/1990 | Mallik | 359/1 |
| 5,142,384 | 8/1992 | Wood et al. | 359/3 |
| 5,189,531 | 2/1993 | Palmer et al. | 359/3 |
| 5,200,253 | 4/1993 | Yamaguchi et al. | 428/195 |
| 5,319,475 | * 6/1994 | Kay et al. | 359/2 |
| 5,328,436 | 7/1994 | Larsen et al. | 493/213 |
| 5,405,197 | 4/1995 | Makowka | 383/5 |
| 5,476,194 | 12/1995 | Hippely et al. | 222/192 |
| 5,651,741 | 7/1997 | Masutani et al. | 473/200 |
| 5,704,652 | 1/1998 | Curiel | 283/94 |
| 5,721,059 | * 2/1998 | Kito et al. | 428/522 |
| 5,775,534 | * 7/1998 | Webb et al. | 220/269 |
| 5,851,615 | * 12/1998 | Kay | 428/40.1 |
| 5,902,436 | * 5/1999 | Stepanek | 156/233 |
| 5,937,554 | * 8/1999 | Haugk et al. | 215/366 |
| 5,942,077 | * 8/1999 | Tang | 156/361 |

FOREIGN PATENT DOCUMENTS

| | | |
|---|---|---|
| WO93/08084 | 4/1993 | (WO) . |
| WO98/26930 | 6/1998 | (WO) . |

* cited by examiner

Primary Examiner—Rena L. Dye
(74) Attorney, Agent, or Firm—Michael J. McGreal

(57) ABSTRACT

The tube has a non-metallized holographic decoration. This holographic decoration is an inner layer of the tube body which is of a laminate structure. The holographic film layer is a non-metallized layer to prevent the delamination of the tube body when the tube body is formed with an overlap seal. In an overlap seal an edge of the laminate film potentially will be in contact with the contents of the tube. A metallized holographic layer can react with the contents of the tube and cause a delamination of the film in the area of the seal and the consequent failure of the seal. The innermost layer of the tube body will be a layer that is bondable to an outermost barrier layer, and further that is bondable to the shoulder of the tube. It should be bondable to the innermost layer in order to form the longitudinal seal of the tube body. It should be bondable to the shoulder since the primary bond of the shoulder to the tube body is of the shoulder to the innermost layer of the tube body. The innermost layer and the outermost layer preferably are polyene layers. Polyenes form good heat bonds, and in particular, polyene to polyene bonds. Therefore, it is preferred that in addition to the innermost barrier layer and the outermost layer, that the shoulder also be comprised of a polyene.

17 Claims, 1 Drawing Sheet

HOLOGRAPHIC DECORATED TUBE PACKAGE

FIELD OF THE INVENTION

This invention relates to a tubular container that has a holographic decorative layer as an integral part of the tube structure. More particularly, this invention relates to a laminate structure for a tubular container where the holographic film layer is a non-metallized layer and is adjacent an exterior layer of the tube laminate structure.

BACKGROUND OF THE INVENTION

Tube containers can be decorated in various ways depending on the structure of the tube container and how it is made. By decoration is meant all of the indicia that is placed on the tube. This includes brand names, designs and general information printing. Tube containers can be decorated before or after being fully formed. Laminate tubes can be decorated before the tube is fully formed. The webstock from which the body of a laminate tube is formed will be printed when in sheet form with this printed webstock then being formed into the tube body. This webstock can be printed on the exterior surface, or on an inner layer of the laminate. An inner layer such as a paper or film layer can be printed with the decoration. If the tube body is made by extrusion molding or by blow molding, it usually will be decorated after the tube body or tube has been made and prior to filling and sealing. In this latter instance, each tube is put onto a mandrel with the tube surface being printed by relative motion between the tube and a print surface. In such tubes the tube decoration is on the exterior surface. Any one of these techniques can be used to decorate conventional tube containers, such as those used for dentifrices, lotions, shampoos, ointments, hair dressing, foods and other products packaged in tubes.

A new type of decoration for a tube container is holographic decoration. Such a decoration cannot be printed onto the exterior surface of a formed tube. A tube construction technique that can be used for creating holographic effects is a laminate tube. However in use with laminate films there is a tendency for the holographic films to delaminate. One reason is that the traditional holographic films are metallized films. Such metallized holographic films, their structure and their manufacture are described in U.S. Pat. No. 5,200,253. However since in most laminate tubes there will be an overlap longitudinal seal, one edge of the laminate will potentially be exposed to the contents of the tube. This presents the problem of the tube contents reacting with the metal in the holographic film with a delamination of the film. Such a delamination in the area of the longitudinal seal will cause the longitudinal seal to weaken and in many instances to fail.

This problem is solved in the present tube containers since the holographic film will be a non-metallized holographic film. It usually will be a polyester film. Also since polyester films have low moisture barrier properties they will have to be used in the form of a laminate with another film providing the needed moisture barrier properties. Further since the holographic film will be a polyester film it has been found that it cannot be the outermost layer or innermost layer of the tube laminate structure. This is the case since in the construction of a laminate tube the innermost layer must be a layer that can be heat bonded or compression molded to the upper shoulder part of the tube, and heat bonded to the outer laminate layer in forming the longitudinal overlap seal to form the tube body. In the heat bonding of the shoulder to the tube body, the shoulder is made separately from the tube body and bonded by heat to the shoulder. The inner layer of the tube body is bonded to the shoulder. In compression molding of the shoulder to the tube body, the shoulder is formed onto the tube body. That is, it is simultaneously formed and bonded to the inner film layer of the tube body. The longitudinal overlap seal is produced by heat and pressure on the two overlapped edges of the laminate (edge of inner layer and edge of outer layer) to form the sheet webstock into the tube body.

Whether the shoulder is attached to the tube body by heat bonding or compression molding, and forming the longitudinal overlap seal by heat bonding, the innermost layer of the tube body must be of a plastic bondable to the tube shoulder, and to the outermost layer of the tube body. Since like plastics bond best to like plastics, the innermost layer of the webstock preferably should be the same as the shoulder and as the outermost layer of the tube body. Since the shoulders are usually made of a polyene polymer such as polyethylene, polypropylene, polybutene, polybutadiene or an ethylene-propylene copolymer, the innermost layer should likewise be a polyene, and preferably the same polyene. Consequently the preferred structure for the present laminate is a polyene layer bonded to each side of the polyester holographic film. Polyenes provide a good moisture barrier and bond well to the same or other polyenes. Such a structure will provide for a good bond to the shoulder, a strong longitudinal seal and a durable crimp seal at the bottom of the tube.

SUMMARY OF THE INVENTION

The present invention is directed to a tube that has holographic decoration. Such a tube will have a laminate structure tube body that is bonded to a shoulder by heat bonding or compression molding. The body of the tube will have a multilayer laminate structure of an outer polyene layer and at least one inner layer that is a non-metallized holographic film layer. There can, and usually will be one or more other inner layers. That is, there preferably at least will be an innermost polyene polymer moisture barrier layer, the holographic film layer and the outermost layer. There can be additional barrier layers such as an organic barrier layer. A polyene polymer is an alkene polymer such as polyethylene, polypropylene or ethylene-propylene copolymers. Suitable organic barrier layers are comprised of homopolymers and copolymers of vinyl alcohol and of vinyl acetates. These include ethylene vinyl alcohols and ethylene vinyl acetate. In addition, there can be film tie layers between a barrier layer and the holographic film layer and between the holographic film layer and the outermost layer, which usually is a polyene layer. There also can be tie layers between inner barrier layers when there is more than one inner barrier layer. As noted, the shoulder is bonded to the innermost layer. In a preferred embodiment the shoulder is comprised of a polyene and the innermost layer is a polyene.

The holographic film layer is a non-metallized film layer. This usually is a polyester such as polyethylene terephthalate or polyethylene naphthalate. The holographic effect is formed on the surface of the film through the use of various printing and embossing techniques. A metallized layer is not used. A metallized layer would have a tendency to delaminate along the longitudinal seam of the tube by reaction of the contents of the tube with the metal of the metallized. Such a delamination would cause the tube to fail along the longitudinal seam.

The net result is a tube that has a holographic decoration, the tube body via the innermost film layer is readily bondable to the shoulder, and the innermost layer also is readily bondable to the outermost layer. Further, the tube body is not susceptible to delamination at the longitudinal seal due to the fact that the holographic film is not a metallized film.

DETAILED DESCRIPTION OF THE INVENTION

Figure 1:
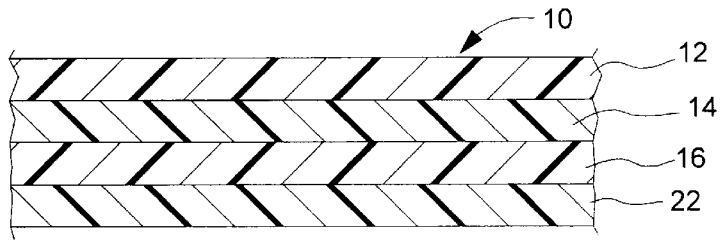
FIG. 1 is a cross-section of the holographic laminate film.
Figure 2:
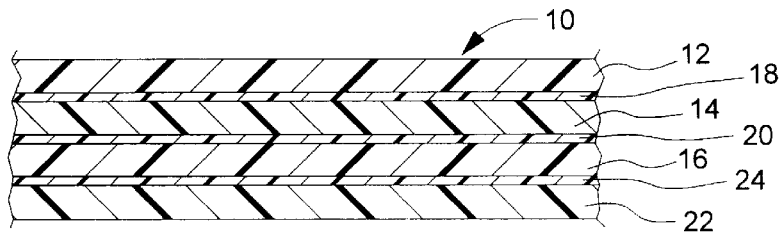
FIG. 2 is a cross-section of the holographic laminate film of FIG. 1 showing adhesive tie layers.
Figure 4:
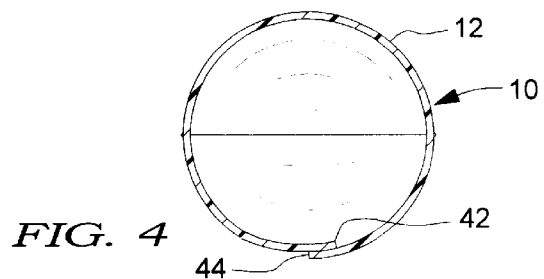
FIG. 4 is a cross-sectional view of the overlap longitudinal seal on the tube body along line 4—4 of FIG. 3.

The invention will be described in detail with reference to the preferred embodiment shown in the figures. In FIG. 1 the laminate 10 is comprised of outer layer 12, a non-metallized holographic film layer 14, first inner barrier layer 16, and a second inner barrier layer 22. The second inner barrier layer 22 must be bondable to the shoulder of a tube. It also must be readily bondable to the outer layer 12 since the longitudinal seal of the laminate tube usually is an overlap seal. In such a seal the inner layer of one edge of the laminate will overlap the outer layer of another edge of the laminate as is shown in FIG. 4. This exposes an edge of the laminate to the contents of the tube. It is for this reason that the holographic layer is a non-metallized layer and is essentially non-reactive with the contents of the tube. In most instances the polymer of this outer layer 12 and the second inner barrier layer 22 will be a polyene such as polyethylene, polypropylene, polybutene, polybutadiene or ethylene-propylene copolymers. The holographic film layer 14 can be any plastic used to produce holographic films and usually will be a polyester. Suitable polyesters are polyethylene terephthalate and polyethylene naphthalate. Either inner barrier layer can be a moisture barrier layer or an organic barrier layer. Polyenes are suitable as moisture barrier layers. Useful polyenes as previously set out are polyethylene, polypropylene, polybutene, polybutadiene and ethylene-propylene copolymers. However, polyenes are not very effective organic barrier layers. Useful organic barrier films are homopolymers and copolymers of vinyl alcohol and vinyl acetate such as ethylene-vinyl alcohol and ethylene vinyl acetate. Preferably the outer layer 12 and the second inner layer 22 are of the same polymer. The various film layers can be bonded directly one to the other, or can be bonded indirectly through the use of tie layers. The use of tie layers to bond the film layers of the laminate is shown in FIG. 2. Here outer layer 12 is bonded to holographic film layer 14 by tie layer 18, the holographic film layer is bonded to the first inner barrier layer 16 through tie layer 20 and the second inner barrier layer 22 is bonded to the first inner barrier layer 16 through tie layer 24.

The tie layers are comprised of good adhesives. Suitable tie layer polymers are acrylates such as ethyl methyl methacrylate polymers and ethylene acrylic acid polymers.

The laminate is produced in a continuous sheet with these layers. The holographic film layer will provide a background decoration. Conventional laminate forming equipment can be used.

Figure 3:
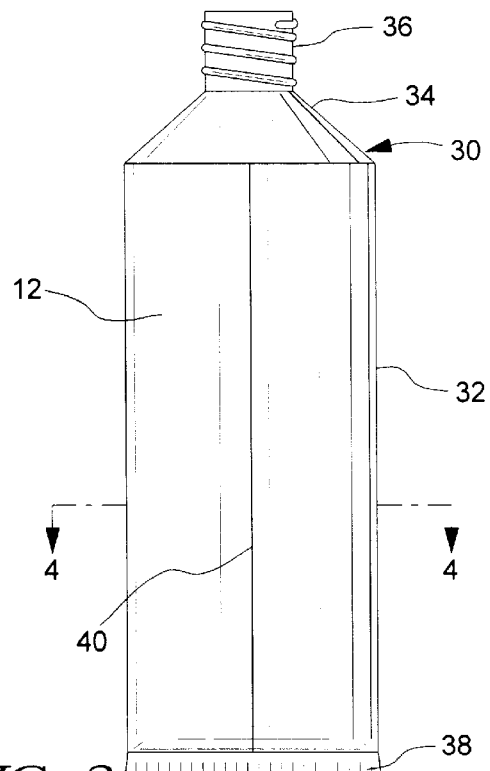
FIG. 3 is an elevational view of a holographic tube showing the longitudinal seal.

FIG. 3 shows a completed tube 30. This is comprised of tube body 32 and tube shoulder 34. The tube shoulder has an externally threaded exit nozzle 36. The tube body 32 is comprised of a laminate of the structure of FIG. 1 or FIG. 2. There is a longitudinal overlap seam 40 extending from the shoulder 34 of the tube to the crimp seal 38. The structure of this seal is shown in more detail in FIG. 4. End 44 of the laminate overlaps end 42. The second inner barrier film layer of end 44 bonds to outer film layer of end 42. An overlap seal is preferred over an abutting seal, also known as a fin seal. This overlap seal is visually more acceptable and it precludes having the two edges of the laminate extending outwardly from the tube body. However a disadvantage is that the edge of the laminate is exposed to the contents of the tube. If the holographic layer film was a metallized film it is likely that the contents of the tube would react with the metal of the metallized layer with the result being the delamination of the laminate along the longitudinal overlap seal.

This invention provides a way for tubes to be produced with holographic decoration and to have a strong bond attachment to the shoulder and to have a strong longitudinal seal. There is produced an effective holographic decoration for tubes.

What is claimed is:

1. A tubular container having a body portion and a shoulder portion, the shoulder portion having a nozzle on one end, the other end of said shoulder portion being attached to said body portion, said body portion having a laminate structure comprising at least one holographic film layer, said holographic film layer being a non-metallized holographic film layer and being bonded on one side with at least one outer film layer and on another side with an inner film layer said inner film layer bonded to said shoulder portion to form said tubular container.

2. A tubular container as in claim 1 wherein said non-metallized holographic film layer is overlayed on another side with at least one outer film layer, said at least one inner film layer bondable to said at least one outer film layer.

3. A tubular container as in claim 2 wherein said shoulder portion adjacent said body portion is comprised of a polyene, said at least one inner film layer overlaying said holographic film being bondable to said shoulder portion by means of heat.

4. A tubular container as in claim 2 wherein there is an adhesive tie layer between said non-metallized holographic film layer and said at least one outer film layer and between said non-metallized holographic film layer and said at least one inner film layer.

5. A tubular container as in claim 2 wherein said at least one outer film and said inner film overlaying are polyenes.

6. A tubular container as in claim 5 wherein said polyene is one of polyethylene and polypropylene.

7. A tubular container as in claim 2 wherein there are at least two inner film layers, at least one inner film layer being a moisture barrier layer and at least one inner film layer being an organic barrier layer.

8. A tubular container as in claim 1 wherein said holographic film layer is a polyester film layer.

9. A tubular container as in claim 8 wherein said polyester film is one of a polyethylene terephthalate film and polyethylene naphthalate film.

10. A tubular container as in claim 9 wherein said polyester film is a polyethylene terephthalate film.

11. A tubular container as in claim 1 wherein said body portion is comprised of at least one inner film layer on the side of holographic film layer opposite said at least one outer film layer, said at least one inner film layer bondable to said shoulder portion.

12. A tubular container having a tubular body portion having a first end and a second end and a shoulder portion, the shoulder portion comprised of a polyene and having a nozzle on one end and another end of said shoulder portion being attached to the first end of said body portion, said body portion being comprised of at least three film layers, at least one layer being a non-metallized holographic film layer, at least one outer polyene film layer bonded to a first side of said non-metallized holographic film layer and at least one inner barrier film layer bonded to a second side of said non-metallized holographic film layer, a second end of said body portion crimp sealed by the bonding of said at least one inner barrier layer on a first side to itself, said at least one inner barrier film layer bonded to the other end of said shoulder portion to attach said body portion to said shoulder portion.

13. A tubular container as in claim 12 wherein said body portion is comprised of said at least four layers in a longitudinal overlap seal arrangement with an edge of said four layers being in contact with any contents of the tubular container.

14. A tubular container as in claim 12 wherein said holographic film layer is a polyester film layer.

15. A tubular container as in claim 12 wherein said polyene layers are selected from the group consisting of polyethylene, polypropylene polybutene, polybutadiene and ethylene-propylene copolymers.

16. A tubular container as in claim 12 wherein between said non-metallized holographic layer and each of said at least one inner barrier film layer, said at least one outer polyene film layer there is an adhesive tie layer.

17. A tubular container as in claim 16 wherein there are at least two inner barrier film layers with an adhesive tie layer between each of said at least two inner barrier film layers.

* * * * *